US011441025B2

(12) United States Patent
Schelero et al.

(10) Patent No.: US 11,441,025 B2
(45) Date of Patent: Sep. 13, 2022

(54) RELEASE COMPONENTS TO INCREASE ANTI-ADHESION PROPERTIES OF THERMOPLASTIC PACKAGING MATERIAL

(71) Applicant: CLARIANT INTERNATIONAL LTD, Muttenz (CH)

(72) Inventors: Natascha Schelero, Hattersheim (DE); Thierry Muller, Ettelbruck (LU); Angelica Marson, Schwalbach am Taunus (DE); Alessandra Stella Sacchi, Milan (IT)

(73) Assignee: Clariant International Ltd, Muttenz (CH)

( * ) Notice: Subject to any disclaimer, the term of this patent is extended or adjusted under 35 U.S.C. 154(b) by 283 days.

(21) Appl. No.: 16/303,405

(22) PCT Filed: May 22, 2017

(86) PCT No.: PCT/EP2017/062256
§ 371 (c)(1),
(2) Date: Nov. 20, 2018

(87) PCT Pub. No.: WO2017/202764
PCT Pub. Date: Nov. 30, 2017

(65) Prior Publication Data
US 2020/0317899 A1 Oct. 8, 2020

(30) Foreign Application Priority Data
May 24, 2016 (EP) .................................... 16170974

(51) Int. Cl.
| C08L 23/00 | (2006.01) |
| C08L 23/06 | (2006.01) |
| C08K 3/22  | (2006.01) |
| C08K 5/053 | (2006.01) |
| C08L 25/06 | (2006.01) |
| C08K 3/26  | (2006.01) |
| C08K 5/103 | (2006.01) |

(52) U.S. Cl.
CPC .............. *C08L 25/06* (2013.01); *C08K 3/22* (2013.01); *C08K 3/26* (2013.01); *C08K 5/053* (2013.01); *C08K 5/103* (2013.01); *C08L 23/06* (2013.01); *C08L 2203/16* (2013.01); *C08L 2207/062* (2013.01); *C08L 2207/066* (2013.01)

(58) Field of Classification Search
CPC .......... C08L 23/06; C08L 23/00; C08L 25/04; C08L 25/06; C08L 29/08; C08L 35/06; C08L 55/02; C08K 5/1535; C08K 5/053; C08K 5/103; C08K 3/22
See application file for complete search history.

(56) References Cited

U.S. PATENT DOCUMENTS

| 4,611,024 | A  | * | 9/1986  | Wolfe ....................... C08K 3/24 524/108 |
| 5,001,176 | A  | * | 3/1991  | Nakazima ................ C08K 5/05 524/108 |
| 5,414,030 | A  | * | 5/1995  | Kotani .................. C08K 5/103 524/99 |
| 6,013,723 | A  | * | 1/2000  | Akao ...................... C08L 23/04 524/568 |
| 6,238,615 | B1 | * | 5/2001  | Kobayashi ................. C08J 5/00 264/140 |
| 6,245,843 | B1 |   | 6/2001  | Kobayashi et al. |
| 6,270,209 | B1 | * | 8/2001  | Shimomura ......... B41J 2/17503 347/86 |
| 8,304,487 | B2 |   | 11/2012 | Malacarne et al. |
| 8,795,745 | B2 |   | 8/2014  | Mentink et al. |
| 2003/0215555 | A1 | * | 11/2003 | Leigner ................. B32B 27/302 426/570 |
| 2007/0018143 | A1 | * | 1/2007  | Goossens ............... C09K 21/08 252/609 |
| 2007/0142534 | A1 | * | 6/2007  | Moad ...................... C09C 3/006 524/543 |
| 2007/0179230 | A1 |   | 8/2007  | Sperlich et al. |
| 2009/0298978 | A1 | * | 12/2009 | Rotzinger ................ C08K 5/17 524/505 |

(Continued)

FOREIGN PATENT DOCUMENTS

| CN | 103539966 A |   | 1/2014 |   |
| CN | 105504576 A | * | 4/2016 | .............. C08L 27/06 |

(Continued)

OTHER PUBLICATIONS

JP 2001-258404 A (Sep. 25, 2001); machine translation. (Year: 2001).*
JP 2003-18922 A (Jan. 21, 2003); machine translation. (Year: 2003).*
CN 105504576 A (Apr. 20, 2016); machine translation. (Year: 2016).*
JP 2005-126341 A (May 19, 2005); machine translation. (Year: 2005).*
International Search Report and Written Opinion dated Aug. 16, 2017, issued in corresponding International Patent Application No. PCT/EP2017/062256.

(Continued)

*Primary Examiner* — Rip A Lee
(74) *Attorney, Agent, or Firm* — Morgan, Lewis & Bockius LLP

(57) ABSTRACT

The invention relates to a composition Z comprising a component A, component B and/or C, and component D, wherein the component A is a thermoplastic material selected from the group consisting of polyolefins, polyolefin copolymers and polystyrenes; the component B is an organic additive selected from the group consisting of glycerol, a polyglycerol, a glycerol ester, a polyglycerol ester and a combination thereof; the component C is an organic additive selected from the group consisting of sorbitol, a sorbitol ester, sorbitan, a sorbitan ester, and a combination thereof; the component D is an inorganic additive selected from the group of layered double hydroxides.

20 Claims, No Drawings

(56) References Cited

U.S. PATENT DOCUMENTS

| | | | |
|---|---|---|---|
| 2010/0152341 A1* | 6/2010 | Chatterjee | C08K 5/005 524/91 |
| 2013/0005871 A1* | 1/2013 | Puhala | C08L 23/283 524/71 |
| 2013/0251769 A1 | 9/2013 | Smith et al. | |
| 2014/0187666 A1 | 7/2014 | Aizenberg et al. | |
| 2015/0118427 A1 | 4/2015 | Kolditz et al. | |

FOREIGN PATENT DOCUMENTS

| | | | | |
|---|---|---|---|---|
| EA | 908 B1 | 6/2000 | | |
| EA | 18951 B1 | 12/2013 | | |
| EP | 0459208 A2 | 12/1991 | | |
| EP | 0931805 A1 | 7/1999 | | |
| EP | 1362792 A2 | 11/2003 | | |
| EP | 2230270 A1 | 9/2010 | | |
| EP | 2662407 A1 | 11/2013 | | |
| JP | 10324662 A | 12/1998 | | |
| JP | 11292993 A | 10/1999 | | |
| JP | 11310648 A | 11/1999 | | |
| JP | 2000063683 A | 2/2000 | | |
| JP | 2001-258404 A | * | 9/2001 | A01G 9/14 |
| JP | 2003-18922 A | * | 1/2003 | A01G 13/02 |
| JP | 2005-126341 A | * | 5/2005 | A61K 31/60 |
| JP | 2011-225638 A | 11/2011 | | |
| JP | 2011219562 A | 11/2011 | | |
| JP | 2012046692 A | 3/2012 | | |
| JP | 2014-195965 A | 10/2014 | | |
| JP | 20150677005 A | 4/2015 | | |
| RU | 2034002 01 | 4/1995 | | |
| RU | 2177479 02 | 12/2001 | | |
| RU | 2334766 02 | 9/2008 | | |
| RU | 2359983 02 | 6/2009 | | |
| RU | 2551515 02 | 5/2015 | | |
| TW | 446730 B | 7/2001 | | |
| WO | 03/002639 A1 | 1/2003 | | |
| WO | 2010/043813 A1 | 4/2010 | | |
| WO | WO 2013/117957 A2 | * | 8/2013 | C01F 7/00 |
| WO | WO 2014/063762 A1 | * | 5/2014 | C08K 3/22 |

OTHER PUBLICATIONS

Search Report issued in corresponding Russian Patent Application No. 2018144172, dated June 28, 2020.

Office Action issued in corresponding Russian Patent Application No. 2018144172, dated Jun. 15, 2020.

Office Action issued in corresponding Chinese Patent Application No. 201780031073.9, dated Jul. 3, 2020.

Office Action dated Jan. 5, 2022 issued in corresponding Japanese Patent Application No. 2018-559915 (4 pages).

Decision of Patent Grant—Korean 10-2018-7037399 dated Jan. 24, 2022 (1 page).

* cited by examiner

RELEASE COMPONENTS TO INCREASE ANTI-ADHESION PROPERTIES OF THERMOPLASTIC PACKAGING MATERIAL

The present invention relates to a packaging material made of an organic polymer comprising release agents that provide anti-adhesion properties to packaging articles, increasing release characteristics towards sticky products, thus reducing the amount of products remaining in the packages. It also relates to mono- and multilayer rigid packaging containers or flexible films able to impart improved release properties to packages. Furthermore, the present invention relates to the use of release agents in food, beverage, personal care, cosmetics, household, industrial, and pharmaceutical packaging and to plastic materials and articles comprising said release compositions.

For the purposes of the invention, masterbatches (MB) are compositions comprising a polymeric carrier or a liquid vehicle and an additive, where the additive is present in the masterbatch in higher concentrations than in the final application or in the final article, and the carrier does not have to be the organic polymer of the final application or of the final article. Preferred concentrations of the additives in a masterbatch range preferably of from 0.5 to 90% by weight, more preferably of from 1 to 80% by weight, the % by weight based in each case on the total weight of the masterbatch.

For the purposes of the invention, compounds (CO) are compositions comprising an organic polymer and an additive, where the additive is present in the compound in the desired concentration for the final application or for the final article, and the organic polymer is the organic polymer of the final application or of the final article, so that the compound is merely brought to the desired shape of the final application or of the final article by means of a physical shaping process.

Many food and beverage, personal care, cosmetics, pharmaceutical, household and industrial products are packaged in plastic containers. Polymeric materials commonly used in packaging applications are polyolefins (i.e. LDPE, LLDPE, HDPE, PP) and polystyrene.

One object of the present invention is to increase the release properties of plastic packages and to improve the emptying behaviour of sticky end-consumer products, especially in formulations in which the solvent base is water. A list of end-consumer products of possible application inclusive but not exclusive is: ketchup, yoghurt, dairy drinks, mayonnaise, dressings, toothpaste, hair conditioner and body cream.

Many end-consumer products cannot easily be removed from packages; they adhere to the internal surface of the packaging articles, due to properties related to their intrinsic formulation and rheological status for example mayonnaise, ketchup, toothpaste, and hair conditioner. The residue remaining in the package represents a high percentage of waste for the end-consumers and also has a strong environmental impact, worsening the recyclability of the not-completely emptied packages.

There is a need for improved emptying properties of containers used for different types of packaging applications and for different end-consumer products, with the aim of diminishing the adhesion between the internal surface of the packaging article and the adjacent end-consumer product.

A number of solutions claiming anti-adhesion properties of end-consumer products have been reported, which mainly relate to surface coatings or surface post-treatments or to the additivation of the packaging materials.

US-2013/0251769 discloses non-wetting and self-lubricating surfaces used for food and other consumer product packaging and processing equipment. Containers having liquid encapsulated coatings showed effective emptying properties.

US-2014/0187666 discloses slippery liquid-infused porous surfaces. Such surfaces consist of microstructured substrates infused with a lubricating fluid that is locked by the substrate and shows anti-wetting properties, thus significantly reducing the adhesion of a broad range of biological materials.

EP-1362792 discloses plastic food packages in which the composition of the packaging material, or at least of the internal layer of a multilayer packaging structure directly in contact with the foodstuff, contains glycerol monostearate (known as GMS, it is a glycerol ester of stearic acid with a C18 carbon chain). The latter is described as a release agent allowing food products to be dispensed more easily from packaging containers. The additive is said to prevent especially cheese from sticking to the packaging material during a certain period of time. GMS is rather hydrophilic and migrates rapidly due to its low molecular weight; it is then absorbed by the hydrophilic cheese and extracted in few months from the surface of the plastic packaging material.

US-2007/0179230 discloses the use of polyol ester additives based on fatty acids with longer chain length than stearic acid (C18). This reduces the migration of the additive from the inner layer of the multilayer packaging structure to the foodstuff and prolongs the anti-adhesion effect during the storage time. Due to the reduced migration, a satisfactory anti-adhesion effect can be obtained with a smaller amount of additive. The most suitable polyol esters are glycerol or glycol monoesters with a fatty acid chain length of 20 to 30 carbon atoms, most preferably glycerol monobehenate (C22). It has been recognised that glycerol monobehenate still migrates from the thermoplastic packaging material during prolonged storage time and is absorbed by the foodstuff.

EP-2230270 discloses anti-adhesion agents to be used in thermoplastic packages material based on high molecular weight hydrophobic polyol ester of a di-, tri, or polyhydric alcohol having a chain length of at least 4 carbon atoms and a fatty acid. The high molecular weight of the additives reduces the migration effect from the inner layer of the multilayer packaging structure into the foodstuff, however the correlation between the additives concentration and the expected anti-adhesion effect on the final packaging product is not reported.

Summarising, a number of attempts have been made to prepare packaging materials with anti-adhesion properties, mostly applied to foodstuff. There have been numerous approaches involving the use of multilayer packaging structures comprising organic additives. Most of these systems have at least one or several disadvantages including multi-step post treatments after packaging manufacturing, reduced recyclability, and high migration of organic additives into foodstuff with consequently reduced anti-adhesion effect compared to the expected shelf life of the end-consumer products. The known compositions do not satisfy all present-day requirements of industry, especially with regards to the release properties of packaging articles.

There is a need for better solutions providing anti-adhesion properties to thermoplastic packaging materials and containers that are compatible with the polymeric materials with respect to formability and mechanical stability, e.g. density, stiffness and tear strength, while enabling packaging design flexibility. In particular, and within the scope of the present invention, preferred solutions are masterbatches and compounds comprising release agents that impart anti-adhesion properties to thermoplastic materials and corresponding packaging containers.

Surprisingly, the use of a specific inorganic compound in combination with specific organic compounds, as disclosed hereinafter, in blends of thermoplastic materials, for the forming of articles, e.g. packaging materials for food and beverage, personal care, cosmetics, pharmaceutical, household and industrial plastics products, shows a considerable improvement of the release performances compared with blends of thermoplastic materials and organic additives not comprising the inorganic compound.

Therefore, one subject of the present invention is a composition Z comprising a component A, component B and/or C, and component D, wherein the component A is a thermoplastic material selected from the group consisting of polyolefins, polyolefin copolymers and polystyrenes;
the component B is an organic additive selected from the group consisting of glycerol, a polyglycerol, a glycerol ester, a polyglycerol ester and a combination thereof;
the component C is an organic additive selected from the group consisting of sorbitol, a sorbitol ester, sorbitan, a sorbitan ester, and a combination thereof;
the component D is an inorganic additive selected from the group of layered double hydroxides.

The term "component B and/or C" means either component B alone, or component C alone, or a combination of component B and C.

Another subject of the invention is a composition Z consisting of a component A, component B and/or C, and component D, wherein components A, B, C, and D are as defined above.

Preferably the component B is present in an amount of from 0.05 to 20%, more preferably 0.1 to 10%, most preferably 0.1 to 5%, by weight, based on the total weight of composition Z.

Preferably the component C is present in an amount of from 0.05 to 20%, more preferably 0.1 to 10%, most preferably 0.1 to 5%, by weight, based on the total weight of composition Z.

Preferably, the inorganic component D is present in an amount of from 0.05 to 30%, more preferably 0.1 to 15%, most preferably 1 to 5%, by weight, based on the total weight of composition Z.

Preferred polyolefins and polyolefin copolymers, i.e. component A within the meaning of the invention, are thermoplastic polyolefins known in the art and are selected from the group consisting of
polyethylene (PE), preferably selected from the group consisting of high density polyethylene (HDPE), medium density polyethylene (MDPE), low density polyethylene (LDPE), linear low density polyethylene (LLDPE), metallocene low density polyethylene (mLDPE) and metallocene linear low density polyethylene (mLLDPE),
polypropylene (PP), preferably selected from the group consisting of polypropylene homopolymer (PPH), polypropylene random copolymer (PP—R) and polypropylene block copolymers (PP-block-COPO),
PE copolymers, preferably selected from the group consisting of ethylene-vinyl acetate copolymers (EVA), copolymers of ethylene and methyl acrylate (EMA), copolymers of ethylene and butyl acrylate (EBA), copolymers of ethylene and ethyl acrylate (EEA), and cycloolefin copolymers (COC),
general purpose polystyrene (GPPS) and high impact polystyrene (HIPS);
more preferably of
high density polyethylene (HDPE) and low density polyethylene (LDPE)
polypropylene homopolymer (PPH),
general purpose polystyrene (GPPS).

Preferred polystyrenes, i.e. component A within the meaning of the invention, can be a styrene homopolymer, an alkylstyrene homopolymer, preferably a $C_1$-$C_4$-alkylstyrene homopolymer, for example α-methylstyrene homopolymer; a styrene copolymer, especially a high impact polystyrene (HIPS).

High impact polystyrenes (HIPS) are generally prepared by polymerization by grafting mixtures of styrene and optionally of one or more copolymerizable vinyl monomers, preferably mixtures of styrene, methylstyrene, ethylstyrene, butylstyrene, halostyrenes, vinylalkylbenzenes, such as vinyltoluene, vinylxylene, acrylonitrile, methacrylonitrile, lower alkyl esters of methacrylic acid, in the presence of a rubbery polymer trunk comprising copolymers chosen from polybutadiene, polyisoprene, rubbery styrene-diene copolymers, acrylic rubber, nitrile rubber and olefinic rubbers, such as propylene diene monomer rubber (PDM) and propylene rubber (PR). In the high impact polystyrene, the rubbery polymer trunk normally constitutes from 5 to 80% by weight, preferably 5 to 50% by weight, of the total weight of the grafted polymer.

The preferred density of component A is of from 1.0 to 1.1 g/cm$^3$, more preferably of from 1.02 to 1.06 g/cm$^3$, even more preferably of from 1.03 to 1.05 g/cm$^3$.

Preferred polystyrenes are polystyrenes with a MFR at 200° C./5 kg according to ISO 1133 of from 0.1 to 300 g/10 min, more preferably of from 1 to 200 g/10 min, even more preferably of from 5 to 100 g/10 min, especially of from 10 to 50 g/10 min, more especially of from 15 to 35 g/10 min, in particular of from 20 to 25 g/10 min.

Preferred glycerol, polyglycerols as well as esters thereof, i.e. component B within the meaning of the invention, are glycerol, and preferably di-, tri, tetra-, penta- and hexaglycerol, more preferably di-, tri- and tetraglycerol, and alkyl esters thereof wherein the esters have alkyl chain lengths of $C_8$-$C_{18}$, more preferably $C_{10}$-$C_{18}$, especially $C_{12}$-$C_{18}$. These type of additives containing a mixture of glycerol, polyglycerols as well as esters thereof are commercially available, an example is Grindsted PGE 308D® supplied by Danisco.

Preferred sorbitol and sorbitan as well as esters thereof, i.e. component C within the meaning of the invention, are sorbitol and sorbitan as well as mono-, di-, tri- and tetra-esters thereof wherein the esters have chain lengths of $C_8$-$C_{18}$, more preferably $C_{10}$-$C_{18}$, especially $C_{12}$-$C_{18}$. Most preferably, the compound contains sorbitol and sorbitan as well as monoesters thereof with $C_{12}$ chain length. Organic additives containing sorbitol and sorbitan as well as esters thereof are commercially available, an example of such is ATMER 100® supplied by Croda.

Preferred layered double hydroxides, i.e. component D within the meaning of the invention, are hydrotalcites.

Particular preference is given to natural or synthetic hydrotalcites or compounds with a hydrotalcite-like structure and mixtures thereof, preferably containing 7-15% Al, 10-28% Mg and optionally 5-15% Zn, wherein aluminum-magnesium-hydroxy carbonate containing 9-12% Al and 20-24% Mg and aluminum-magnesium-zinc-hydroxy carbonate containing 8-13% Al and 12-18% Mg and 9-13% Zn are preferred.

Examples are $[Mg_xAl(OH)_{2X+2}]+[0.5CO_3*nH_2O]$ (x=2 or x=3) such as hydrotalcite, $[Mg_xFe(OH)_{2X+2}]+[0.5CO_3*nH_2O]$ (x=3) as pyroaurite, $[Mg_xCr(OH)_{2X+2}]+[0.5CO_3*nH_2O]$ (x=3) as stichtite, $[Mg_xMn(OH)_{2X+2}]+[0.5CO_3*nH_2O]$ (x=3) as desautelsite, $[Mg_xFe(OH)_{2X+2}]+[OH*2H_2O]$ (x=3) as meixnenite. The number n can be from 1 to 4.

These particularly preferred hydrotalcites are commercially available from Clariant as Hycite 713®, Sorbacid 911®, Sorbacid 944®.

Optionally, composition Z comprises also one or more further additives (component E), which are different from components A, B, C, and D and are selected from the group consisting of natural colorants derived from plants or animals and synthetic colorants, preferred synthetic colorants being synthetic organic and inorganic dyes and pigments, preferred synthetic organic pigments being azo or disazo pigments, laked azo or disazo pigments or polycyclic pigments, particularly preferably phthalocyanine, diketopyrrolopyrrole, quinacridone, perylene, dioxazine, anthraquinone, thioindigo, diaryl or quinophthalone pigments;

preferred synthetic inorganic pigments being metal oxides, mixed oxides, aluminium sulphates, chromates, metal powders, pearlescent pigments (mica), luminescent colours, titanium oxides, cadmium lead pigments, iron oxides, carbon black, silicates, nickel titanates, cobalt pigments or chromium oxides;

fillers and nanosized fillers, preferably silica, zeolites, silicates, particularly preferably aluminium silicates, sodium silicate, calcium silicates; chalk or talc; metal hydrates;

auxiliaries, preferably acid scavengers, processing aids, coupling agents, lubricants, blowing agents, polyhydric alcohols, nucleating agents, or antioxidants, e.g. stearates, or oxides such as magnesium oxide;

antioxidants, preferably primary or secondary antioxidants;

antistatic agents;

UV absorbers, slip agents, anti-fogging agents, anti-condensation agents, suspension stabilizers, anti-blocking agents, waxes, and a mixture of these substances.

Preferably, the composition Z contains of from 14 to 99.98% by weight of component A;
of from 0.01 to 70% by weight of component B and/or C;
of from 0.01 to 80% by weight of component D;
of from 0 to 80% by weight component E;
with the % by weight being based in each case on the total weight of the composition Z; and with the weight percent of the components A, B and/or C, D and optionally E always adding up to 100%.

Expediently, composition Z is or is part of a packaging article, or is a masterbatch MB or a Compound CO, which can be processed into a packaging material and subsequently formed into a packaging article.

The composition Z can be liquid or solid at ambient temperature.

Preferably, in case the composition Z is a masterbatch MB, the composition Z comprises
of from 14 to 90% by weight of component A;
of from 5 to 40% by weight of component B and/or C;
of from 5 to 80% by weight of component D;
of from 0 to 80% by weight of component E;
more preferably
of from 39 to 88% by weight of component A;
of from 5 to 30% by weight of component B and/or C;
of from 7 to 40% by weight of component D;
of from 0 to 80% by weight of component E
with the % by weight being based in each case on the total weight of the composition Z; and with the weight percent of the components A, B and/or C, D and optionally E always adding up to 100%.

Preferably, in case the composition Z is a compound CO, the composition Z comprises of from 88 to 99.98% by weight of component A;
of from 0.01 to 5% by weight of component B and/or C;
of from 0.01 to 10% by weight of component D;
of from 0 to 10% by weight of component E;
more preferably of from 90 to 99.4% by weight of component A;
of from 0.1 to 3% by weight of component B and/or C;
of from 0.5 to 5% by weight of component D;
of from 0 to 8.9% by weight of component E;
with the % by weight being based in each case on the total weight of the composition Z; and with the weight percent of the components A, B and/or C, D and optionally E always adding up to 100%.

Another aspect of the invention is a method of preparing a composition Z, comprising the step of physically mixing components A, B and/or C, D, and optionally E.

Another aspect of the invention is the use of component Z as a release composition in thermoplastic materials which materials are polyolefins, polyolefin copolymers and/or polystyrenes, as described in the foregoing.

Release composition, in the sense of the present invention, is a composition that improves the anti-adhesion properties of a packaging material consisting of or comprising thermoplastic polyolefins, polyolefin copolymers and/or polystyrenes enabling the reduction of end-product residues remaining in the packaging container. Such thermoplastic packaging material can be used in packaging articles for any food or non-food product having the tendency to stick to the packaging inner surface.

The composition Z of the present invention is expediently formed, e.g. blow molded, into a plastic article.

Therefore, another subject of the present invention is a formed plastic article comprising said composition Z.

The formed plastic article according to the invention can be a packaging material, preferably a container, a film or a sheet, especially for use in packaging of personal care, cosmetics, pharmaceutical, household, industrial, food and beverage products where a release surface is needed due to the sticky properties of the product formulation.

Packaging materials suitable for comprising release agent composition Z can be flexible, rigid, semi-rigid or combinations thereof.

Rigid packaging articles typically have wall thicknesses in the range of 100 to 1000 micrometers. Typical flexible packages typically have thicknesses of 5 to 250 micrometers.

Rigid packaging articles or flexible films comprising release agent compositions of the invention can consist of a single layer or may comprise multiple layers. Preferably, the rigid containers, e.g. bottles, or flexible films in which composition Z is used are made of a multilayer structure.

Another subject of the invention is a method to manufacture a plastic material or an article as defined above, characterised in that the components A, B and/or C, D and optionally E, are physically mixed with one another and subjected to a shape forming process.

For physical mixing, it is possible to use a mixing apparatus customary in the plastics industry. Preferably, the mixing apparatus can be one used to make a liquid masterbatch or a solid masterbatch or can be a combination of those apparatuses.

A mixing apparatus for a liquid masterbatch can be a high speed dispersor (e.g. of Cowles™ type), a media mill, a three-roll mill, a submill or a rotor-stator type dispersor.

A mixing apparatus used to make solid masterbatches MB or compounds CO can be a mixer, extruder, kneader, press, mill, calender, blender, injection moulding machine, injection and stretch blow moulding machine (ISBM), extrusion blow moulding machine (EBM), compression moulding machine, compression and stretch blow moulding machine; more preferably a mixer, extruder, injection moulding machine, compression moulding machine, compression and stretch blow moulding machine; even more preferably a mixer, extruder, and extrusion blow moulding machine.

The shape forming process for the article is dependent on the desired shape of article to be manufactured.

Containers are preferably made by blow moulding, injection moulding, injection and stretch blow moulding, extrusion blow moulding, compression moulding, compression and stretch blow moulding processes.

Films and sheets are preferably made by cast or blown film extrusion or co-extrusion processes, depending on the thickness required and on the number of layers needed to obtain specific properties, eventually followed by post-extrusion shaping processes like thermoforming or stretching. In the thermoforming process, the plastic sheet is heated to a pliable forming temperature, formed to a specific shape in a mold, and trimmed to create a final article. If vacuum is used, this process is generally called vacuum forming. In post-extrusion stretching processes an extruded film can be, for example, biaxially oriented by drawing.

For compositions Z comprising more than one masterbatch or components, extruders may be equipped with a metering system for introducing said components and/or masterbatches into the main stream polymer. This metering may be carried out directly with one or more pure components or with one or more masterbatches.

The type of metering equipment used depends on the form in which the pure component or the masterbatch is metered.

In the case of solid component, a metering device of the feed screw type is usually employed and the point of introduction may be the main inlet of the extruder jointly with the feed of the main polymer granules, or in an unpressurized injection zone located along the extruder. For a solid masterbatch, the metering device may be a system comprising an additional extruder that pre-melts the masterbatch, pressurizes it and meters it by means of a metering pump, the amount of masterbatch metered being fed at a point along the main extruder advantageously without pressure.

For a liquid pure component or a liquid masterbatch, the metering device may be a system comprising one or more metering pumps which introduce the liquid masterbatch at the main inlet of the extruder jointly with the feed with the main polymer granules, without any pressure, or at a point under pressure located along the extruder.

The mixing of the components forming composition Z can occur in one step, two steps or in a plurality of steps.

Mixing can occur in one step when the components A, B and/or C, D and optionally components E are directly metered and/or let down in a form of liquid or solid concentrates or as pure components, for example in an extrusion blow moulding machine.

The mixing can also occur in two or three steps, wherein in a first step components B and/or C and D are pre-dispersed into component A, and in one or more consecutive steps are added to component A and optionally component E.

Preferably, component B and/or C and component D are pre-dispersed into component A to form two separate masterbatches, and then these masterbatches are combined with components A and optionally E.

In one preferred embodiment of the invention, in a first step, component B and/or C and component D are dispersed into component A to provide two separate masterbatches. After being melt compounded, for example in a single or twin screw extruder, the extrudates are withdrawn in strand form, and recovered as pellets according to the usual way, such as cutting. In a second step, the obtained masterbatches are metered and let down by a converter/compounder into the main stream of component A pellets and optionally component E pellets, one or both optionally ground, or into the main stream of a concentrate of compound E into compound A, for example in an extrusion blow moulding machine.

In another embodiment of the invention, in a first step, component B and/or C, D and optionally E are dispersed into component A to provide a masterbatch. After being melt compounded, for example in a single or twin screw extruder, the extrudate is withdrawn in strand form, and recovered as pellets according to the usual way such as cutting. In a second step, the obtained solid masterbatch is metered and let down by a converter/compounder into the main stream of component A of e.g. an injection and stretch blow moulding machine, at a rate corresponding to the final desired concentration of component B, C, D and E in the article and without the step of separately metering component E.

Mixing preferably occurs continuously or batchwise, more preferably continuously; in case of a solid masterbatch MB preferably by extrusion, mixing, milling or calendering, more preferably by extrusion; in case of a liquid masterbatch MB preferably by mixing or milling; in case of a compound CO preferably by extrusion or calendaring, more preferably by extrusion.

Mixing is preferably carried out at a temperature of from 0 to 330° C. The mixing time is preferably of from 5 sec to 36 h, preferably 5 sec to 24 h. The mixing time in the case of continuous mixing is preferably of from 5 sec to 1 h. The mixing time in the case of batchwise mixing is preferably of from 1 sec to 36 h.

In the case of a liquid masterbatch MB, mixing is preferably carried at a temperature of from 0 to 150° C. with a mixing time of from 0.5 minutes to 60 minutes.

In the case of a solid masterbatch MB or a compound CO, mixing is preferably carried out at a temperature of from 80 to 330° C. with a mixing time of from 5 sec to 1 h.

Specific articles of the present invention include containers, films and sheets for packaging personal care, cosmetics, pharmaceutical, household, industrial, food or beverage products, especially where anti-adhesion properties are needed.

The compositions of the present invention are also particularly useful in sheets used for thermoforming into rigid packages and films used in flexible structures. The compositions of the present invention also find use in the manufacture of cosmetic containers and containers for pharmaceuticals devices.

Preferred articles of the present invention are rigid packaging articles, such as bottles, thermoformed sheets and flexible films.

More preferred articles of the present invention are hollow containers which are expediently manufactured by any kind of blow moulding process known in the art.

Blow moulding of thermoplastic hollow containers is conventionally performed either by blow moulding of an extruded thermoplastic polymeric parison (extrusion blow moulding—EBM) or by blow moulding of a thermoplastic polymeric preform, the latter is usually injection moulded from a thermoplastic polymer (injection and stretch blow moulding—ISBM). The hot thermoplastic polymeric parison or the heated preform is received within a mould cavity whereupon pressurized gas provides the blow moulding of the container to the shape of the mould cavity.

Test Methods

Values of density are determined in accordance with ASTM D792 (g/cm$^3$).

Values of melt flow rates (MFR) are determined in accordance with ASTM D1238 (g/10 min at specified temperature and weight)

Measurement method to determine the end-consumer product residues from packaging articles, specifically from bottles:

The tare weight of 250 ml empty bottles is measured using a balance with 0.1 g resolution; the bottles are filled with 200 g of a selected end-consumer product and weighted to determine the "filled bottle weight", the bottles are closed with a cap and left conditioning at 23° C. for 24 hours in the shelf position. The bottles are then emptied by squeezing and shaking by hand, this emptying phase has a duration of 120 seconds. After the first emptying, the bottles are closed with the cap, left upside down for 24 hours, and then opened and squeezed by hand without shaking, to empty the last drops of product.

The bottles are weighted to determine the "empty weight". The percentage of residue is calculated as follows:
[(empty weight−tare)]/(filled bottle weight−tare)]*100

EXAMPLES

% by weight mentioned in the following examples are based on the total weight of the mixture, composition or article; parts are parts by weight;

"ex" means example; "cpex" means comparative example; MB means masterbatch; CO means compound; unless indicated otherwise.

Substances Used

Component A1:

Low Density Polyethylene (LDPE) powder: LDPE Riblene®, M.F.I. 2 g/10 min 190° C. 2.16 kg; density 0.925 g/cm$^3$ (ASTM D3236-88)

Component A2:

Low Density Polyethylene (LDPE) powder: LDPE, M.F.I. 20 g/10 min 190° C. 2.16 kg (ASTM D1238); density 0,922 g/cm$^3$ (ASTM D1505)

Component A3:

High Density Polyethylene (HDPE) powder: HDPE, M.F.I. 25 g/10 min 190° C. 2.16 kg (ASTM D1238); density 0,955 g/cm$^3$ (ASTM D1505)

Component A4:

High Density Polyethylene (HDPE) granules: HDPE Eraclene® BC82 M.F.I. 0.25 g/10 min 190° C. 2.16 kg; density 0,953 g/cm$^3$ (ASTM D1505)

Component B1:

Grindsted® PGE 308D (mixture of mono-, di-, tri-, and tetraglycerol esterified with vegetable fatty acids; total ester content >90%) commercially available from Danisco Component C1:

Atmer® 100 Liquid sorbitan ester (mp 10° C.) CAS. No. 8028-02-2, available from Croda:

Component D1:

Additive commercially available from Clariant as Sorbacid® 911 CAS 11097-59-9

Component D2:

Additive commercially available from Clariant as Hycite® 713 CAS 11097-59-9

Component E1:

Pigment Blue 29 Ultramarine Blue CAS 101357-30-6

Masterbatches MB1 to MB6

The components were homogenized together on a Leistritz® ZSE18HP extruder at a temperature of 150° C. to obtain solid masterbatches MB1 to MB6; Table 1 gives the details.

TABLE 1

| Masterbatches | Components used [parts] | | | | | | | |
|---|---|---|---|---|---|---|---|---|
| | A1 | A2 | A3 | B1 | C1 | D1 | D2 | E1 |
| MB1 | 90 | | | 10 | | | | |
| MB2 | 92 | | | | 8 | | | |
| MB3 | 90 | | | | | 10 | | |
| MB4 | | 80 | | | | | 20 | |
| MB5 | | 70 | | | | | | 30 |
| MB6 | | | 70 | | | | 30 | |

Ex1 to Ex7 and Cpex a) to Cpex7:

Component A4 and the other components were mixed and homogenized in the ratios according to Table 2. The obtained Compounds CO1 to CO15 were used to manufacture 250 ml two-layer bottles via Extrusion Blow Molding process on a Magic Mp® machine. As an example of operational mode, components A4 was inserted in the main hopper applied to the main stream of a Magic Mp® machine (model ME-500/ND), the other components (MB1, MB2, MB3, MB4, MB5, MB6) are added through a secondary dosing unit, each hopper is connected to an extrusion barrel. The melt flow of the material A4 and of the other components is then pushed through a die to produce the parison. Barrel temperatures can be kept at temperatures between 180 and 190° C.; cycle time can vary between 15 and 18 seconds.

The hot thermoplastic polymeric parison is received within a mould cavity whereupon pressurized gas provides the blow moulding of the container to the shape of the mould cavity.

This unit, equipped e.g. with a mould for 250 ml (nominal capacity) bottle, the parison is inserted in the bottle moulds and blown by injecting dry air with a profile of pressure reaching 6 to 8 bar at its maximum, the blowing process requiring 10 to 15 seconds time. Blown bottles are then collected from the blowing unit for the necessary testing.

The end-consumer product selected for the tests was the ketchup Calvé®, the residue of ketchup remaining in the bottles, prepared with compounds CO1 to CO15 as described above, was then measured by following the methods described above. Table 3 gives the details.

TABLE 2

| ex-cpex | Compounds | Components used [parts] | | | | | | | A + B + C + D [%] |
|---|---|---|---|---|---|---|---|---|---|
| | | A4 | MB1 | MB2 | MB3 | MB4 | MB5 | MB6 | |
| cpex a) | CO1 (virgin HDPE) | 100 | | | | | | | — |
| cpex1 | CO2 | 80 | 20 | | | | | | 2 |
| cpex2 | CO3 | 70 | 30 | | | | | | 3 |
| cpex3 | CO4 | 58 | 40 | | | | 2 | | 4 |
| ex1 | CO5 | 60 | 20 | | 20 | | | | 4 |
| ex2 | CO6 | 68 | 20 | | | 10 | 2 | | 4 |
| ex3 | CO7 | 75.5 | 15 | | | 7.5 | 2 | | 3 |
| cpex4 | CO8 | 81.3 | | | | | 2 | 16.7 | 5 |
| cpex5 | CO9 | 64.7 | | | | | 2 | 33.3 | 10 |
| ex4 | CO10 | 65.5 | 10 | 12.5 | | 10 | 2 | | 4 |
| ex5 | CO12 | 55 | | 25 | 20 | | | | 4 |
| ex6 | CO13 | 63 | | 25 | | 10 | 2 | | 4 |
| cpex7 | CO14 | 62.5 | | 37.5 | | | | | 3 |
| ex7 | CO15 | 71.7 | | 18.8 | | 7.5 | 2 | | 3 |

TABLE 3

| Compounds | Ketchup Calvè residue percentage |
|---|---|
| CO1 (virgin HDPE) | 5.6 |
| CO2 (comp) | 4.6 |
| CO3 (comp) | 4.8 |
| CO4 (comp) | 4.8 |
| CO5 (inv) | 3.4 |
| CO6 (inv) | 3.2 |
| CO7 (inv) | 3.5 |
| CO8 (comp) | 5.7 |
| CO9 (comp) | 5.6 |
| CO10 (inv) | 3 |
| CO12 (inv) | 2.9 |
| CO13 (inv) | 2.8 |
| CO14 (comp) | 4 |
| CO15 (inv) | 3.5 |

The invention claimed is:

1. A formed plastic container having an inner surface layer comprising a composition Z;
   wherein composition Z includes a component A, a component D and at least one of component B or component C, or both components B and C, wherein:
   the component A is a thermoplastic material selected from the group consisting of a polyolefin, polyolefin copolymer and polystyrene;
   the component B is an organic additive selected from the group consisting of glycerol, a polyglycerol, a glycerol ester, a polyglycerol ester and a combination thereof;
   the component C is an organic additive selected from the group consisting of sorbitol, a sorbitol $C_8$-$C_{18}$ alkyl ester, sorbitan, a sorbitan $C_8$-$C_{18}$ alkyl ester, and a combination thereof;
   the component D is an inorganic additive selected from the group of layered double hydroxides in an amount from 0.1 to 15%, based on a total weight of composition Z;
   wherein said container is a multilayer container, provided that when component A is a polystyrene composition Z includes component A, component D and both components B and C.

2. The formed plastic container as claimed in claim 1, wherein component B is present in an amount of from 0.05 to 20%, based on a total weight of composition Z.

3. The formed plastic container as claimed in claim 1, wherein component C is present in an amount of from 0.05 to 20%, by weight, based on a total weight of composition Z.

4. The formed plastic container as claimed in claim 1, wherein component D is present in an amount of from 1 to 5%, based on a total weight of composition Z.

5. The formed plastic container as claimed in claim 1, wherein component D is a hydrotalcite.

6. The formed plastic container as claimed in claim 1, wherein composition Z further comprises one or more further additives as component E.

7. The formed plastic container as claimed in claim 6, wherein component E is a colorant.

8. The formed plastic container as claimed in claim 1, wherein the composition Z contains from 14 to 99.98% by weight of component A;
   from 0.01 to 70% by weight of component C; wherein component C is sorbitan, or a sorbitan ester;
   from 1 to 15% by weight of component D;
   from 0 to 80% by weight component E;
   with the % by weight being based in each case on a total weight of the composition Z;
   and with the % by weight of the components A, C, D and optionally E always adding up to 100%.

9. The formed plastic container as claimed in claim 1, wherein the container contains a food or beverage product.

10. The formed plastic container as claimed in claim 1, wherein the container contains personal care, cosmetics, pharmaceutical, household, or industrial products.

11. A method for preparing composition Z as claimed in claim 1, comprising the step of physically mixing component A, component D and at least one of component B or component C, or both components B and C.

12. A method for preparing composition Z as claimed in claim 11, comprising the step of physically mixing components A, C, and D.

13. A formed plastic container having an inner surface layer comprising a composition Z;
   wherein composition Z includes a component A, a component D and a component C, wherein:
   the component A is a thermoplastic material selected from the group consisting of a polyolefin, polyolefin copolymer and polystyrene;
   the component C is an organic additive selected from the group consisting of sorbitol, a sorbitol $C_8$-$C_{18}$ alkyl ester, sorbitan, a sorbitan $C_8$-$C_{18}$ alkyl ester, and a combination thereof; and
   the component D is an inorganic additive selected from the group of layered double hydroxides in an amount from 0.1 to 15%, based on a total weight of composition Z.

14. The formed plastic container as claimed in claim 13, wherein component C is sorbitan, or a sorbitan ester.

15. The formed plastic container as claimed in claim 13, wherein component C is present in an amount from 0.05 to 20%, by weight, based on a total weight of composition Z.

16. The formed plastic container as claimed in claim 14, wherein component C is present in an amount from 0.1 to 5%, by weight, based on a total weight of composition Z.

17. The formed plastic container as claimed in claim 13, wherein component D is a hydrotalcite.

18. The formed plastic container as claimed in claim 13, wherein component D is present in an amount from 1 to 5%, based on a total weight of composition Z.

19. The formed plastic container as claimed in claim 13, wherein the composition Z contains:
- from 88% to 99.98% by weight of component A;
- from 0.01 to 5% by weight of component C;
- from 0.01 to 10% by weight of component D;
- from 0 to 10% by weight of an optional component E;
- with the % by weight being based in each case on a total weight of the composition Z;
- and with the % by weight of the components A, C, D and optionally E always adding up to 100%.

20. The formed plastic container as claimed in claim 13, wherein said container is a multilayer container.

\* \* \* \* \*